United States Patent [19]
Lazaros

[11] Patent Number: 6,079,725
[45] Date of Patent: *Jun. 27, 2000

[54] FOLDING WHEELCHAIR WITH IMPROVED SUSPENSION SYSTEM

[75] Inventor: Paul Lazaros, Bloomfield Hills, Mich.

[73] Assignee: Iron Horse Productions, Inc., Port Huron, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,543

[22] Filed: Jul. 24, 1997

[51] Int. Cl.$^7$ .............................. A61G 5/02; B60G 3/14; F16F 9/02; F16F 9/44

[52] U.S. Cl. .............. 280/250.1; 280/283; 280/124.128; 280/124.179; 188/301; 267/218; 267/221

[58] Field of Search .................................... 267/218, 221, 267/177; 188/301, 322.2, 322.21, 313; 280/250.1, 283, 286, 124.128, 124.154, 124.162, 124.179

[56] References Cited

U.S. PATENT DOCUMENTS

| | | | |
|---|---|---|---|
| 864,141 | 8/1907 | Scott | 188/313 |
| 898,043 | 9/1908 | Foster | 188/313 |
| 1,039,555 | 9/1912 | Livermore | 188/301 |
| 1,077,781 | 11/1913 | Yeager | 188/301 |
| 1,120,885 | 12/1914 | Babcock | 188/321.11 |
| 1,150,564 | 8/1915 | Walker | 188/301 |
| 1,252,397 | 1/1918 | Carter . | |
| 1,442,646 | 1/1923 | Butler | 188/313 |
| 1,572,484 | 2/1926 | Homar | 188/313 |
| 2,618,449 | 11/1952 | Kohler . | |
| 2,756,045 | 7/1956 | Savory | 267/218 |
| 2,882,039 | 4/1959 | Haumann | 267/221 |
| 3,038,545 | 6/1962 | Read | 267/218 |
| 3,628,810 | 12/1971 | Graef . | |
| 3,912,292 | 10/1975 | Lichfield | 280/124.128 |
| 4,159,105 | 6/1979 | Vander Laan et al. . | |
| 4,348,016 | 9/1982 | Milly | 267/177 |
| 4,405,119 | 9/1983 | Masclet et al. . | |
| 4,438,908 | 3/1984 | Terada | 267/221 |
| 4,616,810 | 10/1986 | Richardson et al. | 267/218 |
| 4,694,939 | 9/1987 | Heideman et al. . | |
| 4,744,444 | 5/1988 | Gillingham | 267/221 |
| 4,830,395 | 5/1989 | Foley | 267/177 |
| 4,861,056 | 8/1989 | Duffy, Jr. et al. | 280/250.1 |
| 5,044,614 | 9/1991 | Rau | 267/221 |
| 5,460,355 | 10/1995 | Danek . | |
| 5,477,948 | 12/1995 | Stevens | 267/221 |

*Primary Examiner*—Peter C. English
*Attorney, Agent, or Firm*—Harness, Dickey & Pierce, PLC

[57] ABSTRACT

A wheelchair includes an independent suspension system having a spring and a shock absorber located between the chair and the wheel. The load exerted by the spring and the damping provided by the shock absorber are both variable in order to tune the independent suspension to various conditions.

13 Claims, 5 Drawing Sheets

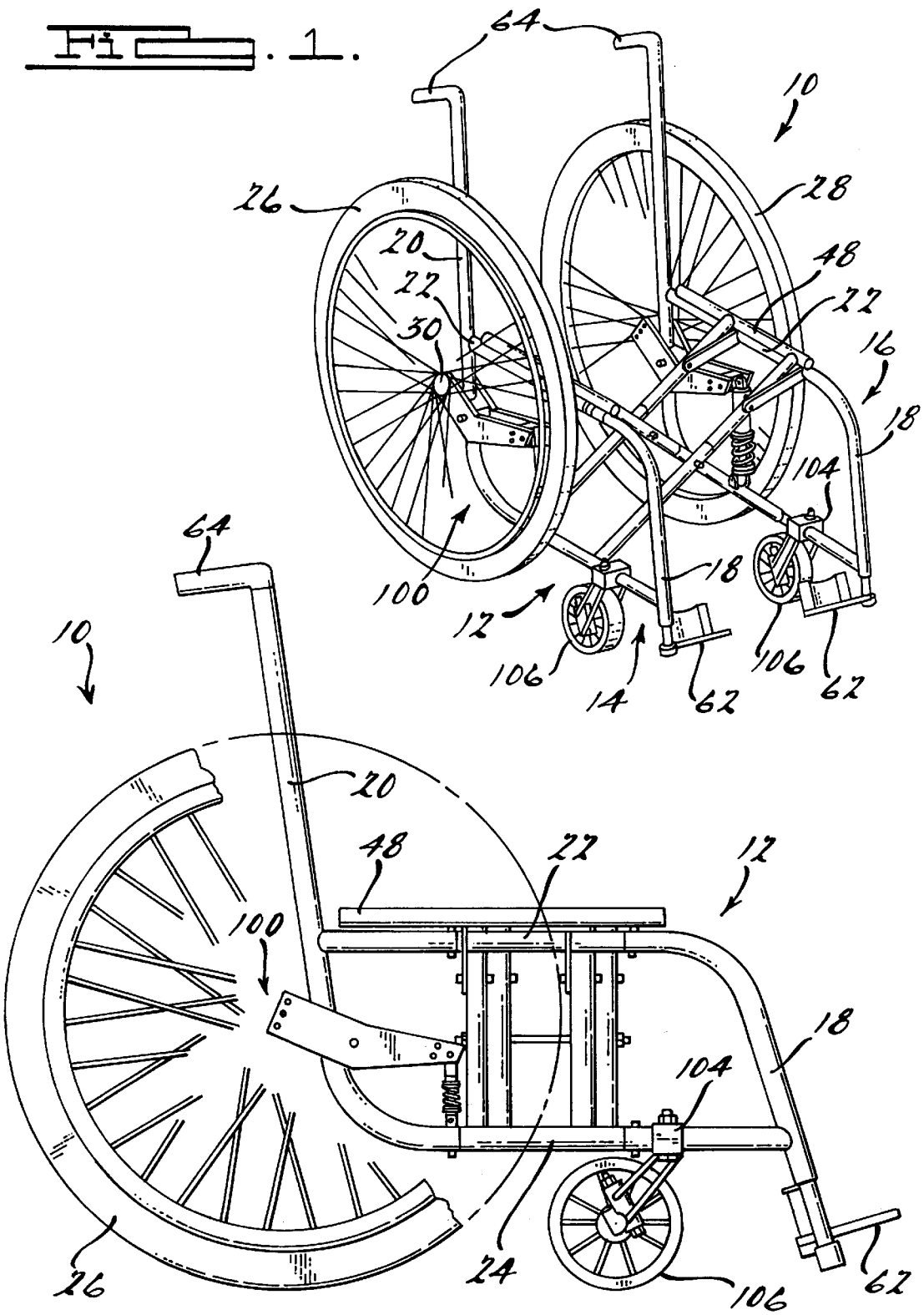

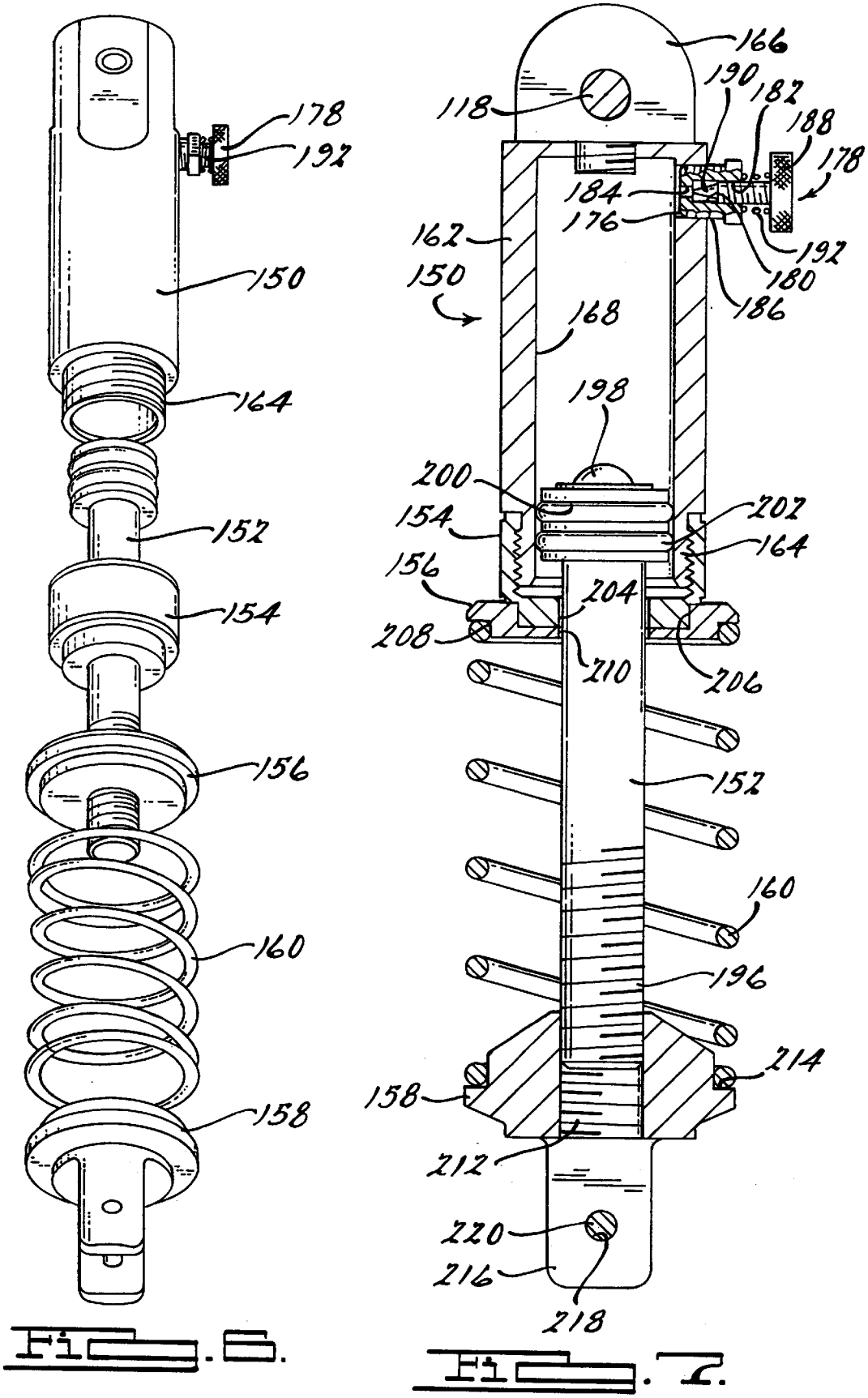

6,079,725

FOLDING WHEELCHAIR WITH IMPROVED SUSPENSION SYSTEM

FIELD OF THE INVENTION

The present invention relates to wheelchairs. More particularly, the present invention relates to an improved suspension system incorporating both a spring and a shock absorber for a wheelchair.

BACKGROUND OF THE INVENTION

Wheelchairs are designed in both non-folding and folding designs. The present invention will be described for exemplary purposes in conjunction with a folding wheelchair. It is to be understood that the unique suspension system of the present invention can be incorporated into either a non-folding or a folding wheelchair and the description of the suspension system in conjunction with a folding wheelchair is not intended to be limiting.

Folding wheelchairs generally comprise a rigid frame with right and left closed frame members and a pair of large wheels rotatably mounted thereon. This arrangement allows the occupant to propel the chair using the wheels. The right and left hand closed frame members, in a folding wheelchair, are usually connected by two diagonally-extending cross-tubes which can be scissored together to fold the chair. While these folding wheelchairs have significantly increased the portability of wheelchairs, they have done so at the cost of sacrificing frame strength and frame stability.

In addition, the large wheels which are rotatably mounted on the rigid frames are generally mounted directly to the rigid frames. This creates a system which is uncomfortable and somewhat unstable when traveling over an uneven terrain. There have been some attempts at overcoming this problem. Assignee's U.S. Pat. No. 4,861,056 the disclosure of which is incorporated herein by reference, discloses an improved frame and suspension system which cushions the occupant and provides better maneuverability.

While these improved frame and suspension systems have contributed to the comfort of the occupant, continued development of wheelchairs and their associated suspension systems has been towards suspension systems that continue to improve the ride and maneuverability of wheelchairs while remaining relatively simple and thus cost effective.

SUMMARY OF THE INVENTION

The present invention provides the art with a wheelchair having a unique suspension system which includes a pair of suspension links each comprising a spring and a damper. The unique suspension system further improves both the ride and maneuverability of the wheelchair.

The unique suspension system of the wheelchair of the present invention includes a pair of pivoting suspension arms, one associated with each main wheel. One end of each arm is attached to the axle which rotatably supports its respective main wheel. The opposite end of each arm is connected to a generally horizontal frame member of the wheelchair by a suspension link which includes a spring and a shock absorber. The pivot point of the suspension arm is provided by a pivot block located between the opposite ends of the arm and mounted to a generally vertical frame member. The wheelchair preferably includes a spring biased caster wheel assembly as part of the suspension system.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a perspective view of a wheelchair incorporating the unique suspension system in accordance with the present invention;

FIG. 2 is a side elevation view of the wheelchair shown in FIG. 1 with the wheel partially broken away;

FIG. 6 is an exploded perspective view of the suspension link shown in FIG. 5; and FIG. 7 is a cross-sectional side view of the suspension link shown in FIG. 5.

DETAILED DESCRIPTION OF THE PREFERRED EMBODIMENT

Figure 3:
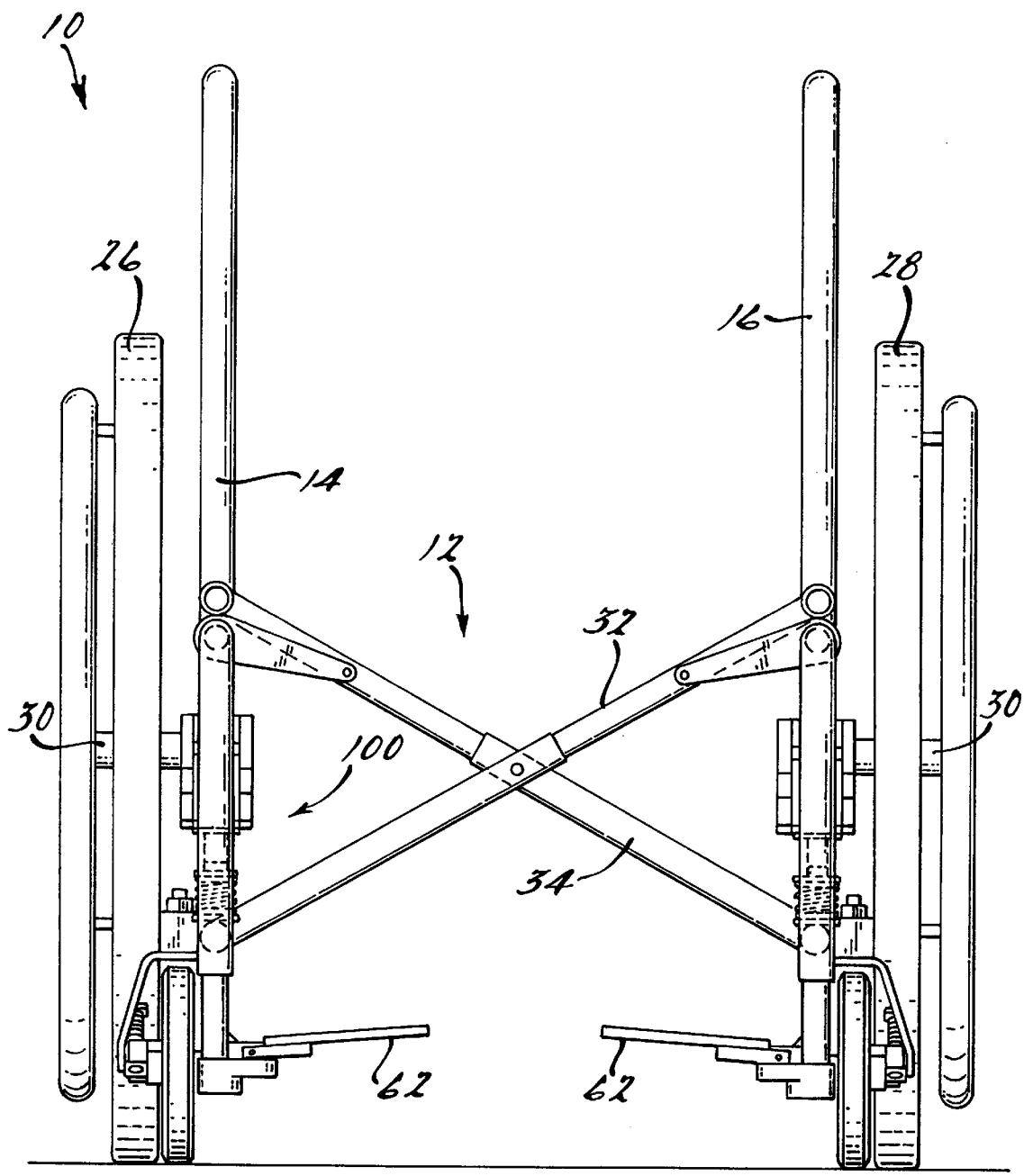
FIG. 3 is a front elevation view of the wheelchair shown in FIG. 1.

Referring now to the drawings in which like reference numerals designate like or corresponding parts throughout the several views, there is shown in FIGS. 1–3 a folding wheelchair incorporating a suspension system in accordance with the present invention which is designated generally by the reference numeral 10. Wheelchair 10 includes a frame 12 which comprises a right rigid frame member 14 and a left rigid frame member 16. Right and left frame members 14 and 16 are preferably constructed from metal tubing. Right and left frame members 14 and 16 each comprise a forward generally vertical frame member 18, an aft generally vertical frame member 20, an upper generally horizontal frame member 22 and a lower generally horizontal frame member 24. A right rear main wheel 26 and a left rear main wheel 28 are rotatably mounted with respect to frame members 14 and 16, respectively, by a respective wheel axle 30.

Referring now to FIGS. 1–4, right and left frame members 14 and 16 are connected to one another by two diagonally-extending sets of cross-tube assemblies 32 and 34. Cross-tube assemblies 32 and 34 can be scissored together to fold or collapse wheelchair 10 for storage or transportation. Each set of cross-tube assemblies 32 and 34 have two diagonally opposing cross-tubes 36 and 38. Cross-tubes 36 and 38 are pivotally secured to one another to provide for the scissor movement. A cross-tube shaft 40 extends between the pivot point of cross-tube assemblies 32 and 34 and cross-tube shaft 40 is secured at each end within a set of cross-tube apertures 42.

Each cross-tube 36 and 38 is comprised of an inner tube 44 and an outer tube 46 fastened together by cross-tube shaft 40 passing through apertures 42. When cross-tube shaft 40 is removed, inner tube 44 and outer tube 46 can be telescoped to adjust the length of cross-tube 36 or 38. The adjustment in length of cross-tube 36 or 38 adjusts the seat width which is defined by the distance between the upper terminal portions of cross-tubes 36 and 38 as described below. Inner tube 44 and outer tube 46 are provided with a plurality of apertures 42 along their length to allow cross-tube shaft 40 to secure cross-tubes 36 and 38 at various lengths.

Figure 4:
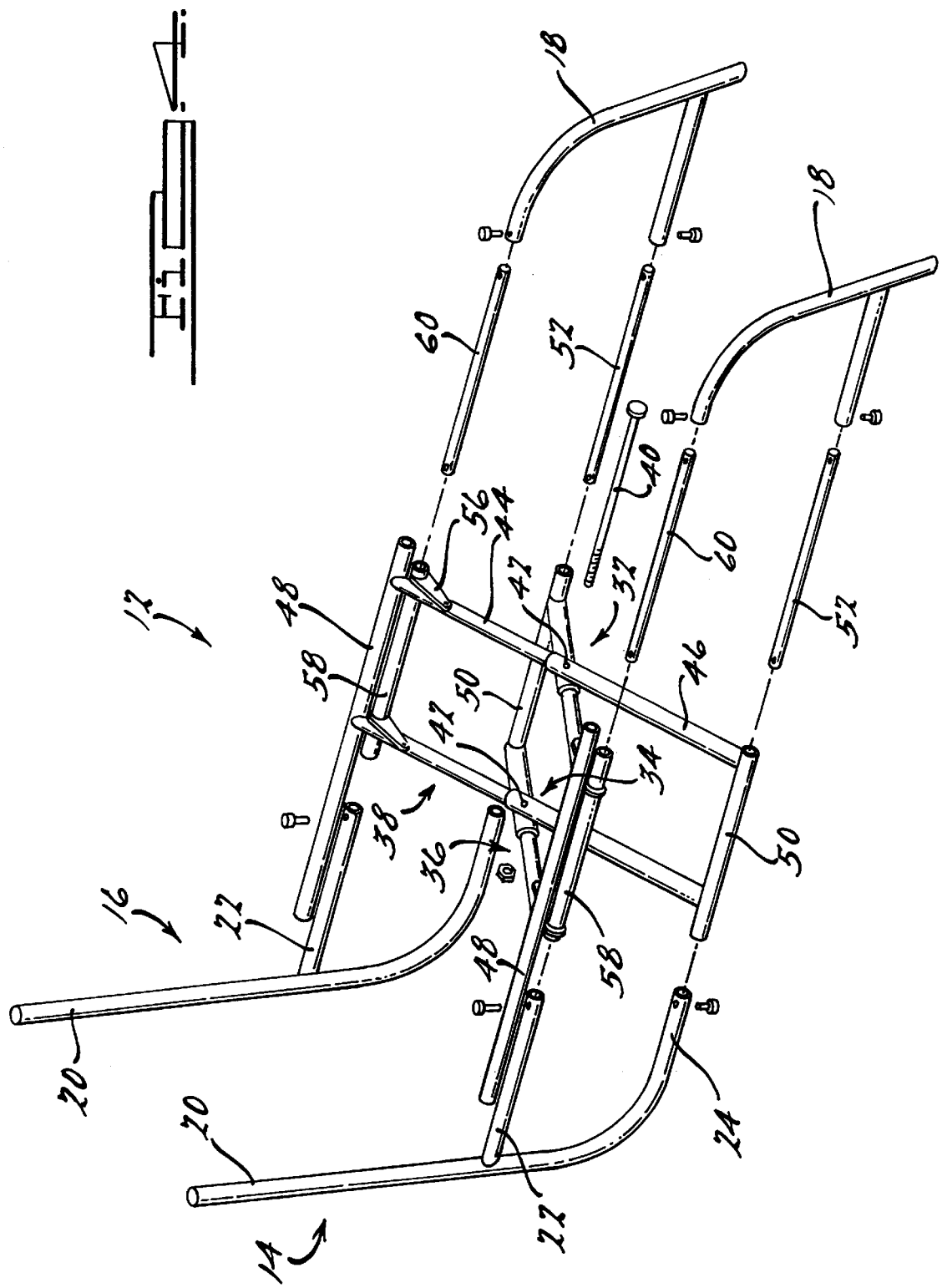
FIG. 4 is an exploded perspective view of the frame construction of the wheelchair shown in FIG. 1.

As shown in FIG. 4, cross-tube assemblies 32 and 34 are rigidly connected together at their terminal portions by an upper terminal tube 48 and a lower terminal tube 50. Opposing upper terminal tubes 48 provide for the seat portion or seat supporting section of wheelchair 10 where a seat sling (not shown) is normally attached. As noted above, the seat width can be varied by adjusting the length of cross-tubes 36 and 38 and thus varying the distance between terminal tubes 48 and 50. A back sling (not shown) is also normally attached to vertical members 20 who form a backrest supporting section to provide for back support for the occupant.

Lower terminal tubes 50 of cross-tube assemblies 32 and 34 are pivotally secured to their respective lower horizontal frame member 24. Lower terminal tube 50 is pivotally secured to frame member 24 by a bushing 52 passing through tube 50. Bushing 52 is bolted or otherwise secured at either end to the rest of frame member 24. This arrangement allows lower terminal tube 50 to pivot with respect to frame member 24 thus permitting cross-tube assemblies 32 and 34 to be scissored together to fold wheelchair 10.

Each cross-tube assembly 32 and 34 is also hingedly secured at the upper portion of inner tube 44 to upper horizontal frame member 22 by a hinge 56. Hinges 56 are rigidly attached to a hinge tube 58. Similar to lower terminal tube 50, hinge tube 58 is pivotally secured to a respective upper horizontal frame member 22 by a bushing 60. Bushing 60 passes through hinge tube 58 and is bolted or otherwise secured at both ends to the rest of frame member 22.

As shown in FIGS. 1–3, frame 12 of wheelchair 10 includes a pair of footrests 62, one attached to the terminal portion of each forward vertical member 18 and a set of handbars 64, one on the terminal portion of each aft vertical member 20. Wheelchair 10 also preferably includes arm rests (not shown) pivotally mounted on each aft vertical member 20.

Wheelchair 10 of the present invention includes an improved suspension system which is indicated generally by the reference numeral 100. Suspension system 100 cushions the occupant during travel over uneven terrain and provides for better maneuverability. Suspension system 100 comprises a pivoting suspension arm assembly 102 disposed on the inside of each rear main wheel 26 and 28 and a spring biased front caster wheel assembly 104 for each front caster wheel 106. Each front caster wheel 106 is a rotatably mounted with respect to frame 12 and each caster wheel 106 is smaller in diameter than wheels 26 and 28.

Figure 5:
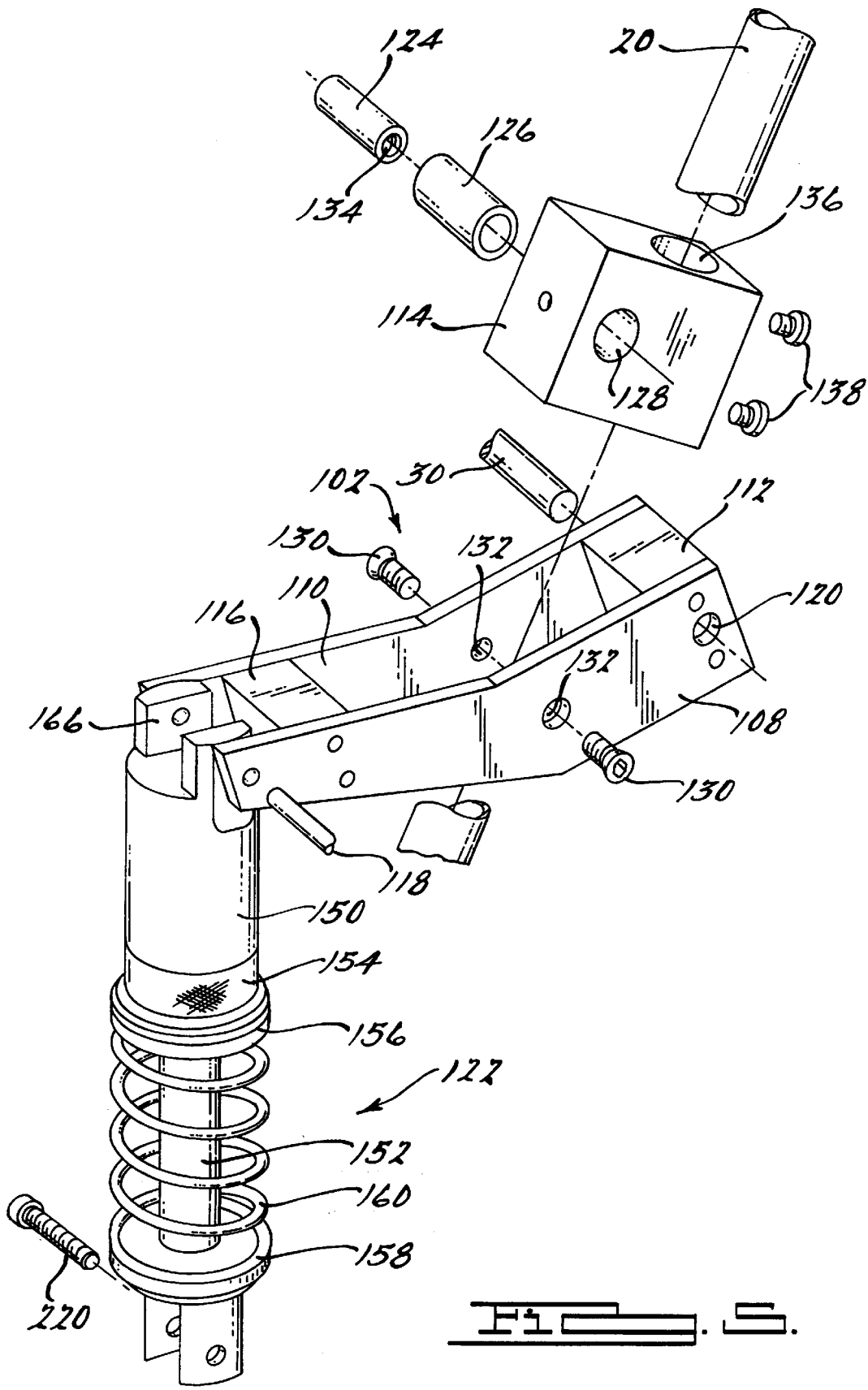
FIG. 5 is an exploded perspective view of the rear suspension arm and suspension link in accordance with the present invention.

Referring now to FIG. 5, each suspension arm assembly 102 comprises a pair of planar arms 108 and 110 having an axle block 112, a pivot block 114, a spring block 116 and a spring pin and bushing assembly 118 disposed therebetween. Suspension arm assembly 102 provides support for wheel axle 30 which extends through an axle block aperture 120 located in axle block 112. The opposite end of suspension arm assembly 102 is attached to a first end of a suspension link 122 by means of spring pin and bushing assembly 118. Suspension link 122 in turn attaches to lower horizontal member 24 of frame 12. Spring block 116 of suspension arm assembly 102 is provided to strengthen and stabilize the arm assembly during operation.

The pivot point of suspension arm assembly 102 is provided by pivot block 114. Pivot block 114 is secured between planar arms 108 and 110 by a bushing 124 encased by a pivot tube 126 which passes through a pivot tube aperture 128 in pivot block 114. Each end of bushing 124 is further secured to arm assembly 102 by a set of screws 130 passing through apertures 132 in planar arms 108 and 110 and engaging a threaded bore 134 in bushing 124. A series of apertures 132 may be provided to allow pivot block 114 to be repositioned closer to either end of arm assembly 102 to adjust the precise pivot point.

Pivot block 114 further provides a point of attachment for suspension arm assembly 102 to frame 12. Pivot block 114 includes a frame member aperture 136 through which aft vertical frame member 20 passes, thereby mounting pivot block 114 and suspension arm assembly 102 to frame 12. Pivot block 114 is secured to vertical frame member 20 by a set of screws 138 passing through corresponding apertures (not shown) in pivot block 114 and vertical frame member 20.

Referring to FIGS. 5–7, suspension link 122 comprises a generally cylindrical housing 150, a piston rod 152, an end cap 154, an upper spring seat 156, a lower spring seat 158 and a coil spring 160. Housing 150 is attached to suspension arm assembly 102 adjacent spring block 116 and lower spring seat 158 is attached to lower horizontal frame member 24 to provide a suspension system for wheelchair 10.

Housing 150 comprises a generally cylindrical body 162 having a threaded portion 164 located at one end and a pair of fingers 166 located at the opposite end. An internal bore 168 extends from threaded portion 164 into cylindrical body 162. Fingers 166 are utilized to pivotally connect housing 150 to suspension arm assembly 102. Pin 118 extends through fingers 166 and suspension arm assembly 102 to mount housing 150 to suspension arm assembly 102. A radial threaded bore 176 extends through body 162 and into bore 168. A valve 178 is threadingly received within bore 176. Valve 178 defines a through bore 180 which includes a threaded portion 182 and a valve seat 184. A radial bore 186 extends through valve 178 and into bore 180. A valve member 188 is threadingly received within threaded portion 182. Valve member 188 defines a conical shaped valve plug 190 which mates with valve seat 184 to limit the amount of fluid flow between bore 168 and the outside environment. By varying the position of plug 190 with respect to valve seat 184, the damping rate for suspension link 122 can be changed. A spring 192 is located between valve 178 and valve member 188 to remove any play between the threaded portions of valve 178 and valve member 188 and to retain valve member 188 at any preset location.

Piston rod 152 includes a threaded portion 196 located at one end and a piston 198 located at the opposite end. Piston 198 defines a pair of seal grooves 200 within which a pair of seals 202 are located. Piston 198 and seals 202 are slidingly received within bore 168. End cap 154 is threadingly received by threaded portion 164 of housing 150 to retain piston 198 within bore 168. End cap 154 defines a bore 204 which slidingly accepts piston rod 152. The clearance between bore 204 and the outside diameter of piston rod 152 allows air to enter and leave bore 168 during the stroking of piston 198.

Upper spring seat 156 is an annular washer which has a cup shaped aperture 206 on one end designed to mate with end cap 154 and an annular shoulder 208 on the opposite end which forms a seat for coil spring 160. A central aperture 210 allows for the movement of piston rod 152 through upper spring seat 156. Lower spring seat 158 defines a centrally located threaded bore 212 which receives threaded portion 196 of piston rod 152. Lower spring seat 158 defines an annular shoulder 214 which forms a seat for coil spring 160. A pair of fingers 216 extend from lower spring seat 158 to mate with frame member 24. Fingers 216 include a pair of apertures 218, one of which is threaded, for accepting a retainer 220 and maintain the connection between suspension link 122 and frame assembly 24. Coil spring 160 is disposed between upper and lower spring seats 156 and 158 and acts to bias piston rod 152 away from housing 150. The amount of load exerted by coil spring 160 can be adjusted by rotating lower spring seat 158 with respect to piston rod 152 due to the engagement between threaded bore 212 and threaded portion 196 of piston rod 152.

In operation, when main wheel 26 or 28 of wheelchair 10 is jolted upward by an unevenness in the terrain, wheel 26 or 28 will be forced upward of its normal position. Suspension arm assembly 102 will then pivot upwards at its axle block end, forcing the spring block end of arm assembly 102 downward and compressing coil spring 160 to lessen the jolt conveyed to the occupant. Piston 198 and piston rod 152 will also be forced into bore 168 pushing air above piston 198 out through valve 178 damping the application of the load to spring 160. The amount of damping is variable and is dependent upon the position of plug 190 with respect to valve seat 184. When spring 160 attempts to return to its original position, this motion will also be damped by the movement of piston 198 and piston rod 152 within bore 168 causing air flow into bore 168 through valve 178 under the influence of a greater pressure in the atmosphere than the pressure in bore 168 above piston 198 through valve 178. Conversely, if the wheel experiences a downward movement due to is encounter with a depression in the terrain, the axle block end of suspension arm assembly 102 will pivot downward and the spring block end of the arm will in turn pivot upward thus relieving the load exerted by coil spring 160 by attempting to pull piston 198 of piston rod 152 out of bore 168. This motion is damped by the movement of piston 198 of piston rod 152 within bore 168 sucking air from the outside atmosphere into bore 168 above piston 198 through valve 178. The amount of damping is variable as described above for the opposite movement of piston 198. When the wheel attempts to return to its original position, this motion will also be damped by the movement of piston 198 of piston rod 152 into bore 168 pushing air from bore 168 out through valve 178. Similarly, caster wheel assembly 104 will compress when caster wheel 106 is jolted upward, and extend when caster wheel 106 is moved downward.

Thus, the functional arrangement of suspension system 100 provides better maneuverability of wheelchair 10 over uneven terrain. Suspension arm assembly's 102 relatively long pivotal axis from wheel axle 30, the independent suspension of all of the wheels and the variable damping of the springs of the suspension system provide the occupant with a sturdy foldable chair with greater comfort and maneuverability than prior art wheelchairs.

While suspension link 122 has been shown as having housing 150 being attached to suspension arm assembly 102 and lower spring seat 158 being attached to lower frame member 24, it is to be understood that suspension link could be reversed by having housing 150 attached to lower frame member 24 and lower spring seat 158 attached to suspension arm assembly 102.

While the above detailed description describes the preferred embodiment of the present invention, it should be understood that the present invention is susceptible to modification, variation and alteration without deviating from the scope and fair meaning of the subjoined claims.

What is claimed is:

1. A wheelchair comprising:
   a rigid frame having a foot rest, a seat supporting section, a backrest supporting section and a pair of handbars;
   a rear pair of wheels rotatably mounted with respect to said frame;
   a front pair of wheels rotatably mounted with respect to said frame, said rear pair of wheels being larger in diameter than said front pair of wheels, wherein the wheelchair is propelled by its occupant or by a person holding onto said handbars; and
   a suspension system disposed between said frame and each of said rear pair of wheels, said suspension system comprising:
      a suspension arm pivotally supported by said frame, said suspension arm having an axle end for rotatably supporting one of said wheels and a suspension link end remote from said axle end;
      a suspension link disposed between said suspension link end of said suspension arm and said frame, said suspension link having a biasing member and a damping member, said damping member reducing in length during a compression stroke and increasing in length during a rebound stroke; and
      an adjustable member for adjusting a compression damping rate during said compression stroke and a rebound damping rate during said rebound stroke.

2. The wheelchair according to claim 1 wherein, said biasing member is adjustable.

3. The wheelchair according to claim 1 wherein said damping member comprises:
   a housing defining a bore, said housing being attached to one of said frame and said suspension arm;
   a piston slidably disposed within said bore; and
   a piston rod connected to said piston, said piston rod being attached to the other of said frame and said suspension arm.

4. The wheelchair according to claim 3 wherein said adjustable member comprises a valve, said valve controlling the flow of fluid into and out of said bore.

5. The wheelchair according to claim 3 wherein said biasing member includes:
   a lower spring seat attached to one of said housing and said piston rod;
   an upper spring seat attached to the other of said housing and said piston rod; and
   a spring disposed between said upper and lower spring seats.

6. The wheelchair according to claim 5 wherein, one of said spring seats is adjustable with respect to the other of said spring seats.

7. The wheelchair according to claim 5 wherein, said upper spring seat is attached to said housing and said lower spring seat is attached to said piston rod.

8. The wheelchair according to claim 7 wherein, one of said spring seats is adjustable with respect to the other of said spring seats.

9. The wheelchair according to claim 1 wherein said biasing member includes:
   a lower spring seat attached to said suspension link;
   an upper spring seat attached to said suspension link; and
   a spring disposed between said upper and lower spring seats.

10. The wheelchair according to claim 9 wherein, one of said spring seats is adjustable with respect to the other of said spring seats.

11. A wheelchair comprising:
    a rigid stationary frame having a foot rest, a seat supporting section, a backrest supporting section and a pair of handbars;
    a suspension arm pivotally supported by said frame;

a rear wheel rotatably mounted to one end of said suspension arm;

a front wheel rotatably mounted to said frame, said rear wheel being larger in diameter than said front wheel, wherein the wheelchair is propelled by its occupant or by a person holding onto said handbars; and a suspension link mounted between the other end of said suspension arm and said frame, said suspension system link comprising:
- a housing defining a bore, said housing being attached to one of said frame and said suspension arm;
- a piston slidably disposed within said bore;
- a piston rod connected to said piston, said piston rod being attached to the other of said frame and said suspension arm;
- a spring disposed between said housing and said piston rod; and
- an adjustable member for adjusting a compression damping rate during a compression stroke of said suspension link and a rebound damping rate during a rebound stroke of said suspension link.

12. The wheelchair according to claim 11 wherein, said spring exerts a load pushing said piston rod away from said housing, said load being variable.

13. The wheelchair according to claim 11 wherein said adjustable member comprises a valve, said valve controlling the flow of fluid into and out of said bore.

* * * * *

UNITED STATES PATENT AND TRADEMARK OFFICE
CERTIFICATE OF CORRECTION

PATENT NO. : 6,079,725
DATED : June 27, 2000
INVENTOR(S) : Paul Lazaros

It is certified that error appears in the above-identified patent and that said Letters Patent is hereby corrected as shown below:

Title Page,
[73] Assignee, "Iron Horse Productions, Inc." should be --George Y. Duffy, Jr.--

Column 3,
Line 44, delete "a"

Signed and Sealed this

Tenth Day of July, 2001

Attest:

NICHOLAS P. GODICI
Attesting Officer
Acting Director of the United States Patent and Trademark Office